(No Model.) 2 Sheets—Sheet 1.

J. C. WILSON.
HAT POUNCING MACHINE.

No. 414,355. Patented Nov. 5, 1889.

(No Model.) 2 Sheets—Sheet 2.

J. C. WILSON.
HAT POUNCING MACHINE.

No. 414,355. Patented Nov. 5, 1889.

Witnesses:
C. Lundgren,
John Bicker.

Inventor:
John C. Wilson
By attorneys
Brown & Griswold

UNITED STATES PATENT OFFICE.

JOHN C. WILSON, OF YONKERS, NEW YORK.

HAT-POUNCING MACHINE.

SPECIFICATION forming part of Letters Patent No. 414,355, dated November 5, 1889.

Application filed February 13, 1889. Serial No. 299,722. (No model.)

*To all whom it may concern:*

Be it known that I, JOHN C. WILSON, of Yonkers, in the county of Westchester, State of New York, have invented a certain new and useful Improvement in Hat-Pouncing Machines, of which the following is a specification.

My improvement relates to machines for pouncing hats, and embraces means for pouncing both the crown of the hat as well as the brim, the pouncing of the brim being performed upon both sides thereof at the same time. All the several pouncing cutters or pads have both a rotary and reciprocatory motion.

I will describe in detail a pouncing-machine embodying my improvement and then point out the novel features in claims.

Figure 2:
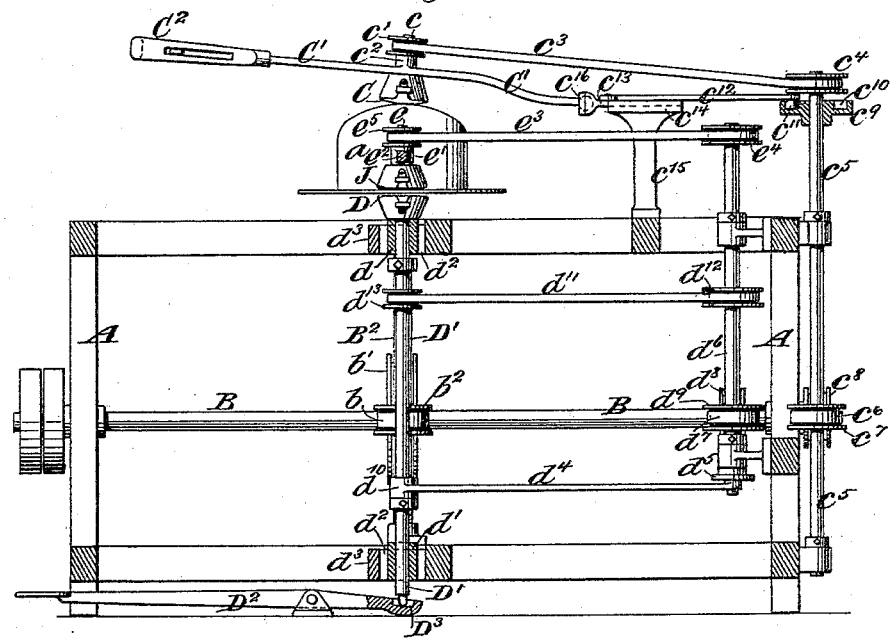
Figure 1:
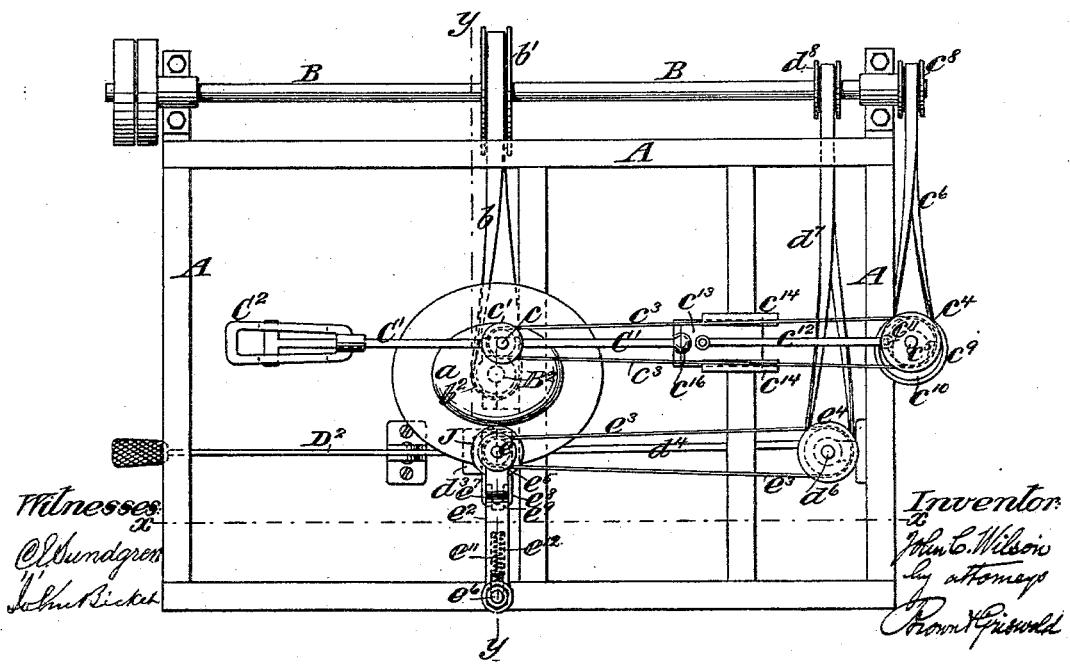
Figure 3:
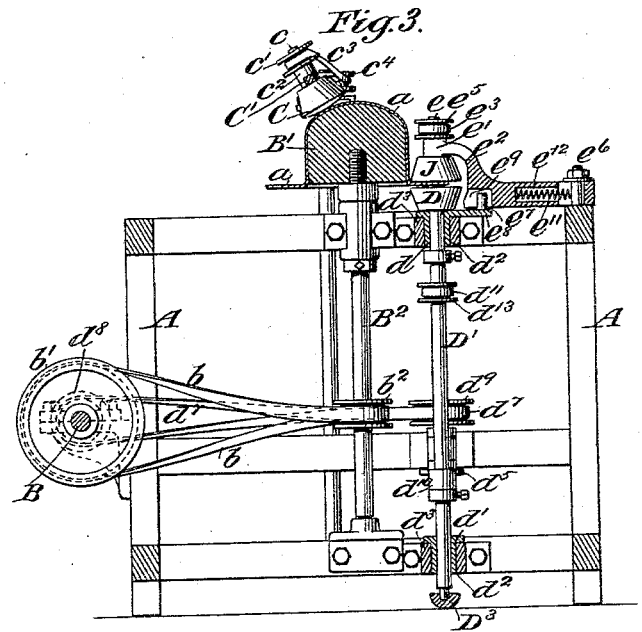
Figure 4:
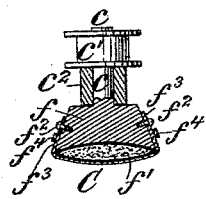

In the accompanying drawings, Figure 1 is a plan or top view of a pouncing-machine embodying my improvement. Fig. 2 is a vertical section thereof, taken on the plane of the line $x\ x$, Fig. 1. Fig. 3 is a vertical section taken at right angles to Fig. 2 and on the plane of the line $y\ y$, Fig. 1. Fig. 4 is a sectional view of a pouncing-pad employed in the machine.

Similar letters of reference designate corresponding parts in all the figures.

The machine is mounted in a frame A, and receives motion from a main or driving shaft B, journaled in the frame A.

B′ designates a hat-block, upon which I have shown placed a hat $a$. The hat-block B′ is mounted upon the upper end of a shaft B², journaled in suitable bearings in the frame, and deriving motion from a belt $b$, passing about a pulley $b'$ on the driving-shaft and about a pulley $b^2$ on the shaft B².

I will first describe means for pouncing the crown of the hat, wherein C designates a pouncing-pad. This pad is secured upon a short shaft $c$, upon one end of which is keyed a pulley $c'$. The shaft $c$ extends loosely through a sleeve or collar $c^2$, arranged between the pad and the pulley $c'$. Rotary motion is imparted to the pulley $c'$ by means of a belt $c^3$, which may be elastic and extends about said pulley and about a pulley $c^4$, mounted upon the upper end of a shaft $c^5$, journaled in suitable bearings upon the frame A of the machine. The shaft $c^5$ receives rotary motion from a belt $c^6$, passing about a pulley $c^7$ on said shaft, and also about a pulley $c^8$ on the main shaft. Keyed upon the shaft $c^5$ so as to rotate therewith is a wheel $c^9$, provided upon its upper side with a cam-groove $c^{10}$. A pin or projection $c^{11}$, secured to or formed with a rod $c^{12}$, extends into said cam-groove. The rod $c^{12}$ is pivotally connected near its other end to a slide-block $c^{13}$. The slide-block $c^{13}$ is arranged in suitable slideways $c^{14}$ upon an upright or standard $c^{15}$, extending from the frame of the machine. When the shaft $c^5$ is rotated, the cam-wheel $c^9$, through the rod $c^{12}$, causes a reciprocating motion to be imparted to the slide-block $c^{13}$.

C′ designates a bar, which bar in this example of my improvement has a ball-and-socket connection at $c^{16}$ with the slider-block $c^{13}$. About midway in its length it is connected to the collar or sleeve $c^2$. When the slider-block $c^{13}$ is reciprocated, reciprocating motion will also be imparted to the pouncing-pad C. By means of the ball-and-socket connection between the rod C′ and the slider-block $c^{13}$ the pad C may be moved about over the crown of the hat and down upon the sides thereof in any desired manner.

I have shown a handle C² upon the bar C′, and with which said bar has a sliding connection. The handle C² may be grasped to move the pouncing-pad about the crown of the hat without interfering with the reciprocating movement of the bar C′. It will thus be seen that both a rotary and reciprocating movement is imparted in unison to the pouncing-pad C during its operation.

D designates a pouncing-pad, which may be similar to the pouncing-pad C, but is mounted upon the upper end of a shaft D′, journaled in bearings $d\ d'$. These bearings are mounted in slots $d^2$, one near the upper end of the shaft D′ and the other near the lower end thereof. The slots $d^2$ are formed in metallic pieces $d^3$, secured upon the frame A. The object of this arrangement is to admit of a bodily movement of the shaft D′ from side to side, so that a reciprocating motion will be imparted to the pad D beneath and against the brim of the hat. This bodily movement of the shaft is accomplished, as here shown, by means of a crank-rod $d^4$, connected near one of its ends to a crank $d^5$ upon the lower portion of a shaft $d^6$, which shaft is journaled in suitable bearings on the frame A and receives rotary motion from a belt $d^7$, passing about a pulley $d^8$ on the main shaft and a pulley $d^9$ on the shaft $d^6$. The crank-rod $d^4$ has secured to it or formed with it at its other end a collar $d^{10}$, through which the shaft D' extends loosely. When the shaft $d^6$ is rotated bodily, side to side movement is imparted to the shaft D'. Rotary motion is also imparted to the shaft D', which motion is simultaneous with its bodily movement. The rotary motion is imparted by means of a belt $d^{11}$, (which may be elastic,) passing about a pulley $d^{12}$ on the shaft $d^6$, and also about a pulley $d^{13}$ on the shaft D'. It will therefore be seen that the pad D has both a rotary and reciprocatory motion in unison beneath and against the under side of the brim.

I have shown a lever $D^2$ provided with a step-bearing $D^3$ for the lower extremity of the shaft D'. This lever may be operated by the foot to raise and lower the shaft D', so as to bring the pad D into or out of contact with the lower side of the hat-brim.

J designates a pouncing-pad adapted to pounce the upper surface of the brim. This pad is arranged above the pad D in this example of my improvement, and like the other pads it has both a rotary and reciprocatory movement. The pad is mounted upon the lower portion of a short shaft $e$, which shaft is journaled in a bearing $e'$, formed upon an arm $e^2$. A rotary motion is imparted to the shaft $e$, and thus to the pad J, by means of a belt $e^3$, which may be elastic, passing about a pulley $e^4$, mounted upon the shaft $d^6$, and also about a pulley $e^5$, mounted upon the shaft $e$. In order to accomplish the reciprocating movement of the pad J, I have shown a convenient means consisting of pivoting the arm $e^2$, near its rearward end, upon a pivot pin or post $e^6$, mounted upon the frame A. The arm $e^2$ may be swung upon its pivot. Swinging motion is imparted to the arm by means of a pin $e^7$, extending upwardly from a metallic plate or bar $e^8$ and into a groove or slot $e^9$, formed longitudinally in the arm $e^2$. The plate or bar $e^8$ is formed with the bearing or sleeve $d$, through which extends loosely the shaft D'. When bodily movement from side to side is imparted to the shaft D', the pin $e^7$, acting in the groove or slot $e^9$, operates to swing the arm $e^2$ to and fro upon its pivot.

It is desirable that the arm $e^2$, carrying the pad J, should be capable of longitudinal movement in order that the pad may follow the contour of the hat-crown. This is accomplished by arranging a spring $e^{11}$ in a socket $e^{12}$, formed in the rearward portion of the arm $e^2$. This spring bears upon one end against the end wall of said socket and at the other end against the pin $e^6$. The pivot-pin $e^6$ extends through a longitudinal slot in the arm $e^2$, which admits of the to-and-fro motion of the said arm. The spring $e^{11}$ operates to hold the pad J in operative position on the hat-brim in whatever position it may be forced by the formation of the hat-block.

In Fig. 4 I have illustrated more clearly the construction of a pouncing-pad which I prefer to employ. This pad comprises a block $f$, which may be made of wood or other suitable material. The under surface of the block is concaved, and within it is set a pad $f'$, which may be made of fur, wool, or other suitable yielding material, and covered with cloth, leather, or similar covering. Outside the pad is arranged the pouncing material, which may be emery-paper and secured upon the sides of the block $f$ by screws $f^2$ or otherwise. I have shown the pouncing material as provided with tabs or tongues $f^3$, which extend through loops $f^4$ upon the block $f$. Although I prefer to use this form of pad, particularly for the crown of the hat, I do not wish to be understood as limiting myself thereto, as any suitable pad or block might be employed which was provided with a pouncing-surface.

Although I have illustrated and described certain mechanism by which the rotary and reciprocating movements of the pads are accomplished, I do not wish to be limited to such means, as it would be quite obvious to mechanics that many different means might be employed for accomplishing this result.

It will be seen that by my improvement the crown and the upper and under sides of the brim are all pounced at one operation and that all the pouncing-pads both rotate and reciprocate. By this means a very effective and rapid pouncing of the hat may be accomplished.

What I claim as my invention, and desire to secure by Letters Patent, is—

1. In a hat-pouncing machine, the combination, with a rotary hat-block, of a pouncing pad or block adapted to be moved about the top and sides of the crown of the hat, a longitudinally-movable support for said pad or block, and a main shaft transmitting rotary motion to the said pouncing pad or block, substantially as specified.

2. In a hat-pouncing machine, the combination, with a rotary hat-block, of a pouncing pad or block adapted to pounce the brim of a hat, a reciprocating support for said pad or block, and a main shaft transmitting rotary motion to said support, substantially as specified.

3. In a hat-pouncing machine, the combination, with a rotary hat-block, of a pouncing pad or block adapted to pounce the upper side of a hat-brim, a second pouncing pad or block adapted to pounce the under side of the hat-brim, reciprocating supports for said pads or blocks, and a main shaft transmitting rotary motion to said supports, substantially as specified.

JOHN C. WILSON.

Witnesses:
ANNA F. WILSON,
HENRY T. BROWN.